Nov. 12, 1957     B. VER NOOY     2,812,778
PIPE LINE PLUGGER
Filed Oct. 10, 1955     4 Sheets-Sheet 1
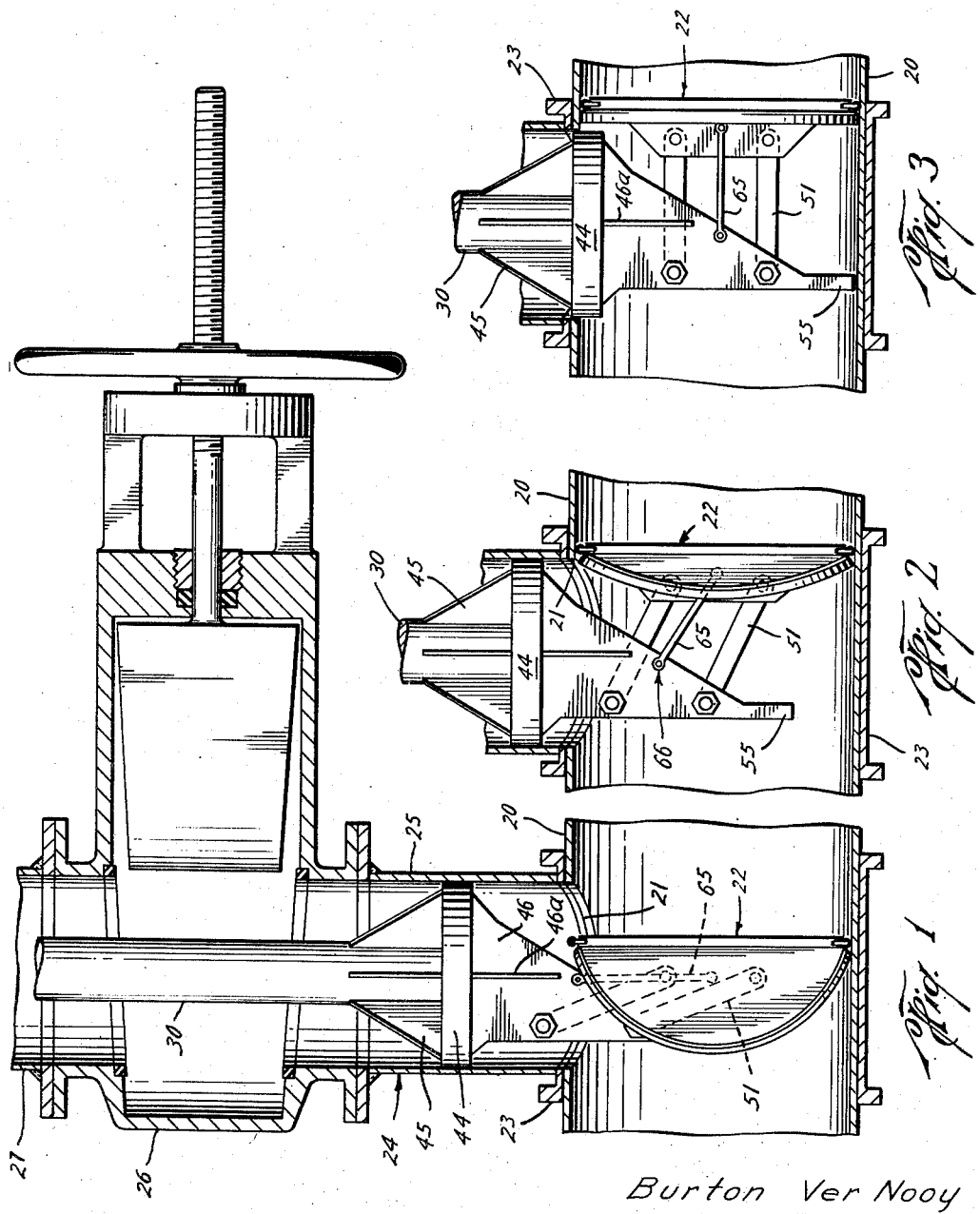
Burton Ver Nooy
INVENTOR
BY
Brownings, Simms & Hyer
ATTORNEYS

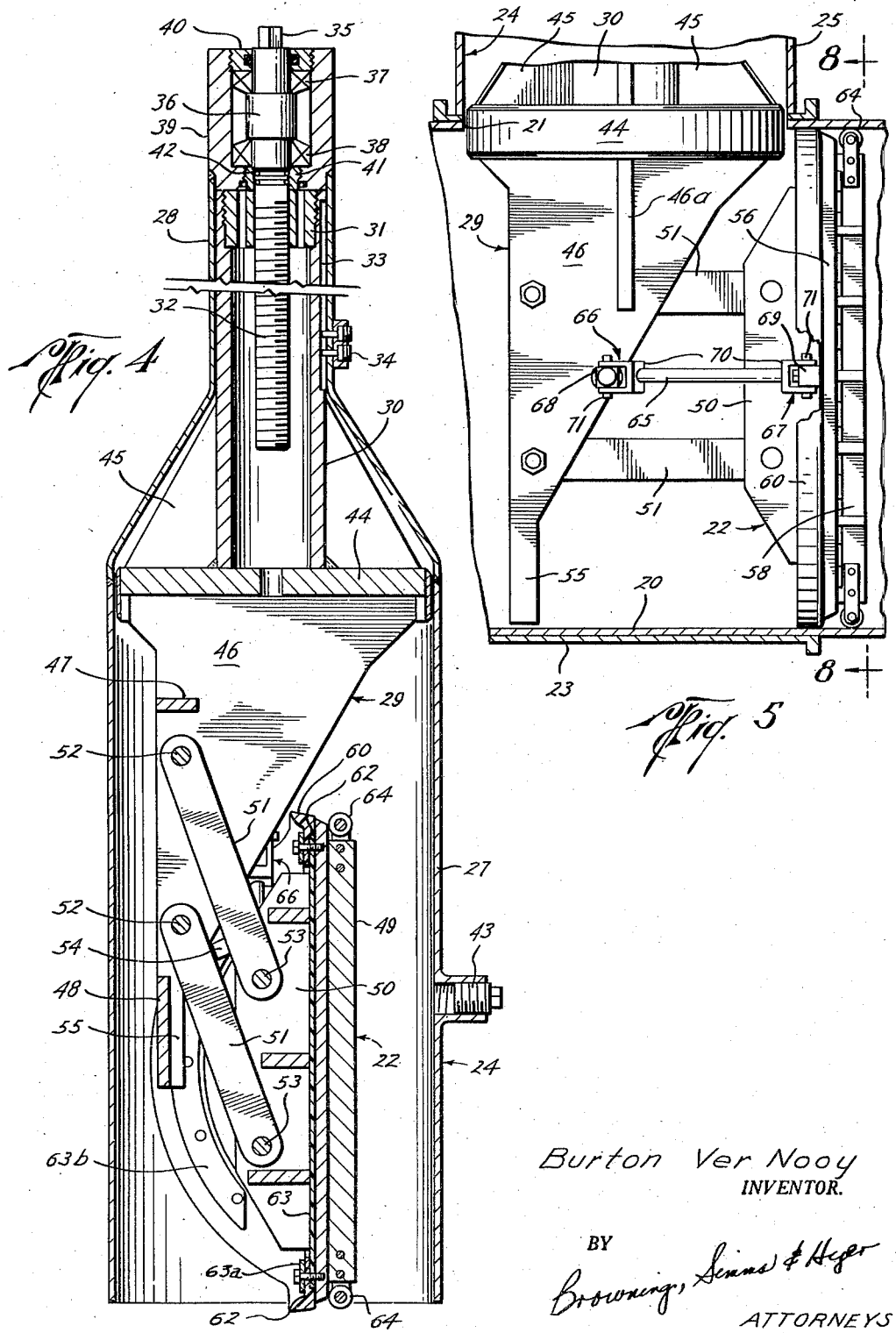

Nov. 12, 1957 B. VER NOOY 2,812,778
PIPE LINE PLUGGER
Filed Oct. 10, 1955 4 Sheets-Sheet 3
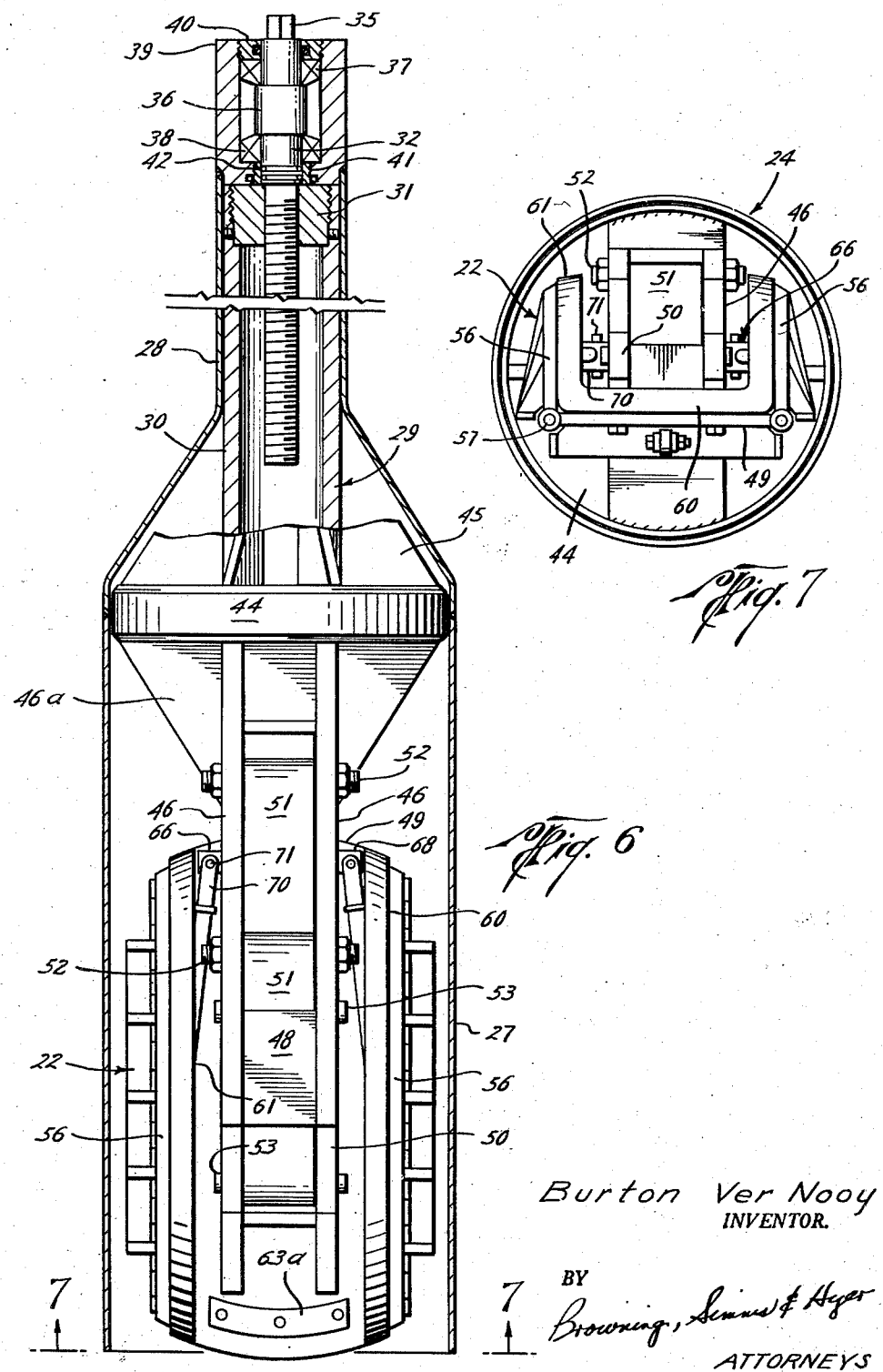
Burton Ver Nooy
INVENTOR.
BY
Browning, Simms & Hyer
ATTORNEYS

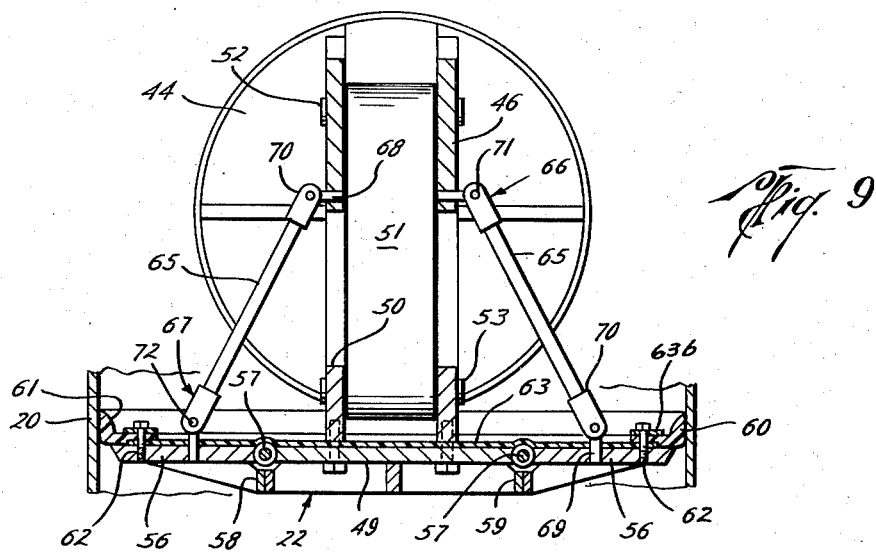
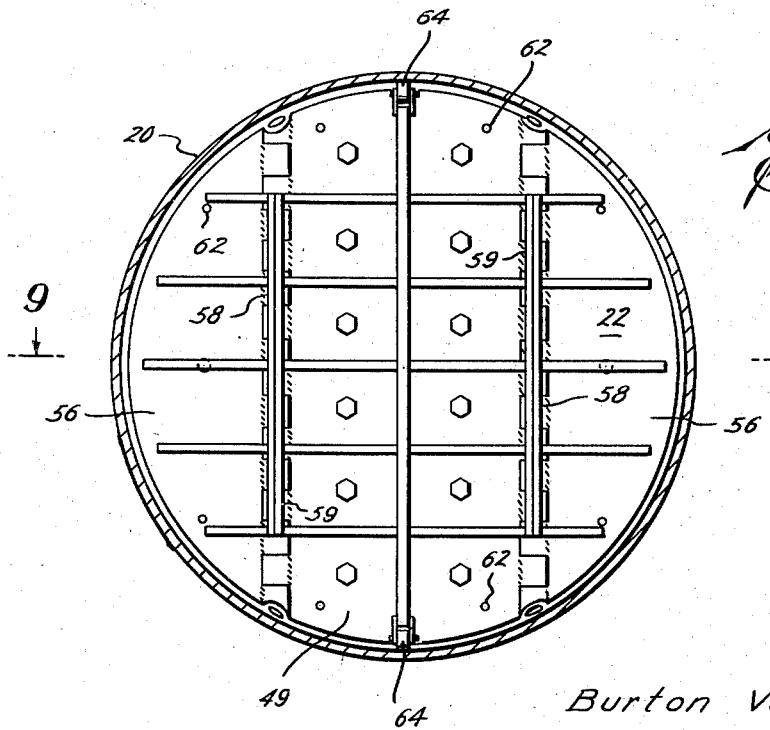

United States Patent Office 2,812,778
Patented Nov. 12, 1957

2,812,778
PIPE LINE PLUGGER

Burton Ver Nooy, Tulsa, Okla., assignor to T. D. Williamson, Inc., Tulsa, Okla., a corporation of Oklahoma Application October 10, 1955, Serial No. 539,487

14 Claims. (Cl. 138—94)

This invention relates to a pipe line plugger of the general type having a plug member insertable across a line through a lateral opening in the line. More particularly, this invention is an improvement over that disclosed in my copending application, Serial No. 465,085, entitled "Pipe Line Plugger," and filed October 27, 1954; and the present invention is a continuation-in-part of said copending application.

As mentioned in the aforesaid copending application, it is often necessary in the maintenance of a pipe line to isolate a portion of the line in order that such portion can be repaired, replaced, or alterations made therein. For example, should a section of pipe line become ruptured and spring a leak, it is desirable to isolate such section from fluid communication with adjacent portions of the line. Upon being isolated, only the isolated section need be drained for repairs, the remainder of the line remaining full of fluid. It will be understood that such isolation should be performed without loss of pressure from within the line, and for this purpose pluggers have been provided with fluid-tight housings mountable on the line in surrounding relation to a lateral opening therein to permit a plug member to be moved from the housing into the line.

As further pointed out in my copending application, conventional pluggers of this type have employed a carrier movable axially within the housing and having the expandable valve means connected thereto for movement through the lateral opening therein and across the line, whereupon the valve means may be expanded to form a plug sealing such line. For this purpose, the valve means frequently comprises a rubber boot or strip having a mechanism internally of the carrier for expanding the boot or strip into sealing engagement with the inner walls of the pipe line. This arrangement requires at least two mechanisms which must be actuated separately: (1) A carrier for moving the valve means into the pipe line, and (2) the mechanism internally of the carrier for expanding the valve means after it has been situated across the line. Not only is such an apparatus unduly complicated and time consuming to operate, but also it has been found difficult to design one of this type sufficiently strong to withstand the high pressures often encountered in pipe lines.

Still further, conventional pluggers of the type above-described necessarily require that a seal be provided not only between the valve means of the plug member and the pipe line, but also between the carrier for the plug member and the housing in which said carrier is movable. That is, inasmuch as the plug member is disposable across the line axially of the aforesaid opening, it will seal only with the interior of the line at opposite sides of the lateral opening. Thus, unless the additional seal is formed about the carrier, fluid may flow past the plug member through the portion of the line intersected by the lateral opening. Obviously, the necessity for a plurality of seals further enhances the possibility of leakage.

The pipe line plugger disclosed in my copending application solved many of the problems presented by the prior art structures by the provision of (1) a plug member having relatively rigid lateral dimensions with a seal surface about the periphery thereof for engagement with the inside diameter of the pipe, and (2) a mechanism for moving the plug member across the line through the opening and laterally into sealing engagement with the inside diameter of the line to one side of such opening. A plugger of this type required neither a separate mechanism for mechanically expanding a valve means on the plug member nor an additional seal between the carrier for the plug member and the housing.

It will be understood, however, that a plug member of this construction required that the lateral opening in the line as well as the diameter of the housing be at least approximately the same size as the inside diameter of the line to be sealed. Over and above this obvious requirement for the installation of large and heavy equipment in the plugging of larger diameter pipe lines, it was necessary to employ expensive machinery for cutting the lateral openings in the line to the size required.

Such machinery is not only expensive but also extremely difficult to properly center in cutting an opening to encompass approximately 180° of the circumference of the line. Yet, unless the opening is cut accurately so that its axis at least substantially intersects that of the line, the plug member cannot be moved therethrough into the line. Still further, even assuming the opening to be cut accurately, the edges of the line adjacent thereto constitute points of weakness, especially inasmuch as the principal strength factor of circular construction adjacent the opening has been nullified.

It will also be understood that even a small amount of movement of the peripheral seal surface of the plug member laterally over the line may require a very large force when the fluid in the line is under high pressure. Thus, depending upon the lateral direction of movement of the plug member, difficulty may be encountered in either inserting or removing such member from across the line.

An object of this invention is to provide a pipe line plugger having the advantages of my earlier invention, but which may be used in plugging a line with a lateral opening therein smaller than the inside diameter of the line.

Another object is to provide a pipe line plugger for use in plugging a line having a lateral opening therein smaller than the inside diameter of the line, in which the plug member thereof may be inserted within or removed from plugging position across the line by the manipulation of only a single mechanism.

Still another object is to provide a pipe line plugger for use in plugging a line having a lateral opening therein smaller than the inside diameter of the line, in which the plug member constitutes the only required sealing element.

A further object is to provide a pipe line plugger of the type having a plug member movable across the line through a lateral opening therein and laterally of the line into sealing engagement therewith to one side of the opening, in which the housing for such plugger may be of a diameter considerably less than the inside of the line.

Yet another object is to provide a pipe line plugger similar to my earlier invention, but in which the periphery of the plug member is sealingly engaged with the line during only a minimum of its movement laterally thereof.

A still further object is to provide, in a pipe line plugger of the same general type as my earlier invention, a plug member which is collapsible and expandable in response to movement thereof laterally within the line to permit collapse of the plug member into a shape for passage through a lateral opening in the line which is smaller than the inside diameter of the line and expansion into a shape for sealing engagement with the line to one side of said lateral opening.

A still further object is to provide a plug member having foldable parts to permit collapse in accordance with the foregoing object, but which are adapted upon expansion to form a relatively rigid barrier across the line.

Other objects, advantages and features of this invention will be apparent to one skilled in the art upon a consideration of the written specification, the attached claims and the annexed drawings.

In the drawings, wherein like reference characters are used throughout to designate like parts:

Figs. 1 to 3 are schematic views illustrating chronologically some of the steps involved in plugging a line by means of a plugger constructed in accordance with this invention;

Fig. 4 is a vertical sectional view of a side of the plugger;

Fig. 5 is a cross-sectional view of the plugger with the plug member thereof across and sealingly engaged with the line to one side of the lateral opening in the line;

Fig. 6 is a view partly in section of the rear of the plugger taken at 90° to Fig. 4;

Fig. 7 is a view of the lower end of the plug member in the collapsed position of Fig. 6, and taken substantially along broken line 7—7 of Fig. 6;

Fig. 8 is an elevational view of the front of the plug member in expanded position and taken substantially along broken line 8—8 of Fig. 5; and Fig. 9 is a horizontal sectional view of the plug member, taken substantially along broken lines 9—9 of Fig. 8.

As in my earlier invention, the improved pipe line plugger of this invention includes a housing mountable on a line to surround a lateral opening in the line, a carrier movable axially within the housing toward and away from the line, and a plug member connected to the carrier for movement from the housing through the lateral opening and into sealing engagement with the line to one side of said opening. Also, the connection between the carrier and plug member may be a linkage operable upon movement of the carrier toward the line to move the plug member axially through the opening and from a first position across the line to a second position across the line to one side of said opening and laterally of said first position. Further, the plug member is removable from sealing engagement with the line upon a reversal of the foregoing—i. e., upon movement of the carrier away from the line so as to move the plug member laterally of the line from the second to the first position and into the housing axially through the lateral opening.

However, in accordance with a novel concept of the present invention, the plug member is expandable and collapsible, and means are provided for collapsing the plug member to permit movement thereof through a lateral opening in the line which is smaller than the inside diameter of the line and for expanding the plug member into sealed engagement with the inside diameter of such line when the plug member is disposed across the line to one side of the lateral opening. More particularly, such plug member expanding and contracting means is responsive to movement of the plug member between the aforementioned first and second positions, whereby the carrier serves to actuate said means and a separate mechanism therefor is not required. Thus, during its movement through the lateral opening and housing and upon movement from said second to said first position, the plug member is collapsed to a shape permitting passage through the opening; while upon movement from said first to said second position, the plug member is expanded to a shape adapted to sealingly engage with the inside diameter of the line.

In its preferred form, this means serves to expand the plug member into sealing engagement with said inside diameter of the line to one side of the opening only substantially during disposal of said member in its second position, whereby said sealing engagement is maintained for only a minimum period of time during lateral movement of the plug member. More particularly, the means for expanding and collapsing the plug member is operable substantially concomitantly with movement of said plug member between said first and second positions.

For this purpose, the plug member may comprise a body part and wing parts hingedly connected to opposite edges thereof for swinging between expanded and collapsed shapes; and the means for so swinging the wing parts may comprise linkage in the form of rods swivelly connecting the carrier to each of the wing parts. In this latter case, the connection operable to move the plug member between first and second positions comprises links pivotally connecting the carrier and body part of the plug member.

As in the case of my earlier invention, the plug member is adapted to form a relatively rigid barrier across the line to withstand high pressures. For this purpose, the wing parts are foldable to abut with opposite edges of the body part in the expanded shape of the plug member. Also, the parts of the plug member are provided with a sealing element about their outer peripheries which requires no mechanical means for expanding same into sealing engagement with the line.

The carrier, which is the only mechanism which must be operated in inserting or removing the plug from across the line, may be moved axially of the fluid-tight housing by means of a rotatable shaft extending through said housing in sealed relation thereto and having an operating part externally thereof.

Referring now to the drawings, and particularly the schematic views of Figs. 1 to 3, there is shown a pipe line 20 through which a circular opening 21 of a diameter considerably less than the I. D. of the line has been cut laterally thereof and along an axis at least approximately intersecting the line axis to permit a plug member 22 to be inserted within and removed from sealing engagement across the line to one side of said opening, as shown in Fig. 3, to provide a barrier to fluid flow from the left. A conventional saddle 23 or equivalent structure is disposed about the line for mounting a flanged nipple 25 which supports the housing 24 in surrounding relation to the lateral opening 21 therein, although it will be understood that the nipple may be secured directly to the line.

The housing provides a fluid-tight enclosure through which the plug member 22 may be moved in a manner to be described, and includes a gate valve 26 having a flanged connection for disposal above the nipple 25. Disposed above gate valve 26 is an elongate tubular part 27 having flanged connection with such valve and a reduced upper end 28 to which a carrier 29 for plug member 22 is connected for movement axially within the housing toward and away from the line. As can be seen from Fig. 1, the nipple 25, gate valve 26 and tubular part 27 provide a continuous passageway of substantially uniform diameter through the housing, the diameter of such passageway corresponding to that of opening 21 to permit movement therethrough of the plug member 22 in its collapsed shape.

The upper end 28 of tubular part 27 of the housing is provided with means for raising and lowering the carrier 29. Although a suitable hydraulic piston and cylinder may be used for this purpose, in the embodiment shown the carrier 29 is provided with a tubular member 30 at its upper end adapted to be guided within the reduced end 28 of tubular part 27, which tubular member 30 supports a jackscrew nut 31 at its upper end for receiving a jackscrew 32 rotatably suspended from the upper end 28 of the housing. The tubular member 30 and reduced portion 28 are also provided with cooperable slide and guide means for converting the rotative movement of the jackscrew 32 into linear movement for the carrier 29. For this purpose, tubular member 30 is provided with a keyway 33 extending longitudinally of its periphery, and the reduced portion 28 is provided with a pair of keys 34 adapted to extend inwardly thereof for reception within the longitudinal keyway 33.

The jackscrew 32 and upper reduced end 28 of the housing are of sufficient length to permit the carrier 29 to be moved between an upper position, as shown in Figs. 4 and 6, in which the plug member 22 is withdrawn from the line into the housing and above gate valve 26, and a lower position such as is shown in any one of Figs. 1 to 3, wherein, the plug member 22 has been moved through lateral opening 21 and across the line 20 beneath the valve.

The jackscrew 32 is provided with a flat-sided part 35 at its upper end exteriorly of the housing to permit its rotation and is received through the upper end of the housing in sealed relation thereto to render said housing fluid-tight. Thus, the jackscrew is provided with an enlarged bearing part 36 supported between roller bearing members 37 and 38 within a recessed portion of a housing 39 at the upper end of reduced portion 28 of tubular part 27. A retainer nut 40 carrying an O-ring or other suitable means for sealing about the jackscrew 32 is threadedly received within the housing 39 above the roller bearing member 37. Bushing 41 is threadedly received in the lower end of the housing 39 and is sealingly engaged by O-rings 42 or the like carried by the jackscrew 32. As can be seen from Figs. 4 and 6, housing 39 is welded to reduced end 28 and retains jackscrew nut 31 in place.

It will be understood from the foregoing that when properly mounted upon the line 20, the housing 24 provides a fluid-tight enclosure in communication with such line 20 so that there is no loss of pressure from the line during insertion or removal of the plug member 22. The housing 20 is installed upon the line in a manner similar to that described in my copending application. Generally, this may be accomplished by first disposing the saddle 23 in a position about the line such that the opening therethrough defines the portion of the line to be cut. The nipple 25 is secured to the saddle and the gate valve 26 to the nipple 25 in the position shown in Fig. 1, and a suitable tapping or cutting machine then removably connected above the gate valve in place of the tubular part 27 of the housing.

With the gate valve 26 open, as shown, the cutting element of the tapping machine may be lowered on a boring bar through the valve and nipple so as to cut the opening 21 in the line to a desired diameter. At this time, the boring bar of the tapping machine may be raised so as to dispose the cutting element above valve 26, the valve closed, and the tapping machine removed from its secured position thereabove. The tubular part 27 of the housing may then be secured, as shown in Fig. 1, above the gate valve 26, such that upon opening of the gate valve, the carrier 29 may be moved as mentioned to insert and remove the plug member 22 from within the line. As shown in Fig. 4, the tubular part 27 of the housing may be provided with a removable plug 43 to permit pressure communication between the interior and exterior of the housing.

The connection between carrier 29 and plug member 22, which is operable to move such plug member laterally of the line between the position of Fig. 1 and the position of Fig. 3 wherein such plug member is sealingly engaged with the inside diameter of the line 20 to one side of lateral opening 21, is substantially similar to that disclosed in connection with my earlier invention. More particularly, such connection comprises a parallelogram type linkage pivotally connected to the carrier 29 and plug member 22 so as to move such plug member with the plane through its lateral dimension substantially parallel to the axis of the housing during movement of said plug member through the housing as well as lateral movement from the first position of Fig. 1 to the second position of Fig. 3. For this purpose, carrier 29 is provided with a circular plate 44 adapted to fit rather closely within tubular part 27 and secured to the lower end of tubular member 30 as by welding. Gussets 45 may be provided to reinforce this connection, as shown. Substantially triangular plates 46 are connected in spaced apart relation to the lower end of circular plate 44 and are reinforced by gussets 46a. Braces 47 and 48 maintain the spacing between the plates.

The plug member 22, which will be described more fully hereinafter, is provided with a body part 49 having flanges 50 bolted thereto, as shown in Fig. 9, and extending in spaced apart relation rearwardly thereof. Links 51 of equal length are pivotally connected to the plates 46 and flanges 50 about spaced apart pins 52 and 53, respectively. More particularly, this linkage arrangement is of a parallelogram type in which the pins 52 are spaced from one another a distance equal to the spacing between the pins 53, and wherein a plane passing through the axes of pins 52 is parallel to a plane passing through the axes of pins 53.

A means is provided for maintaining the plug member 22 in substantially the position shown in Figs. 1 and 4 during its movement axially of the housing 24 so that it may be moved in collapsed shape substantially centrally of such housing to permit the diameter of said housing to be kept at a minimum, and wherein further the plane through pins 53 may be maintained laterally of the plane through pins 52 such that when the plug member 22 strikes the lower part of the line 20 beneath lateral opening 21, the above-described linkage arrangement is operable to move said plug member toward its second position, as shown in Figs. 2 and 3. As can be seen in Fig. 4, this position is maintained by a stop part 54 secured to the upper link for abutment with the lower link in such position.

It will also be noted from Figs. 3 and 5, that this linkage arrangement is such that when the plug member is in its second position for sealing engagement with the line to one side of lateral opening 21, the links 51 are disposed substantially perpendicularly to the axis of movement of the carrier for enabling maximum mechanical advantage in inserting and removing the plug member. Thus, as shown in Figs. 3 and 5, the plates 46 are provided with depending extensions 55 adapted to engage with the lower surface of the line when the plug member 22 has reached its second position, and thus prevent further swinging of links 51 about pins 52 which would result in movement of the plug member back toward the lateral opening 21.

Referring now, however, to the details of the collapsible and expandable plug member 22, it can be seen that wing parts 56 are hingedly connected as at 57 to opposite edges of body part 49 so as to form in their expanded shape, as shown in Figs. 8 and 9, lateral dimensions adapted to sealingly engage with the inside diameter of the line. In this latter expanded position, parts 58 and 59 on wing parts 56 and body part 49, respectively, are adapted to abut one another for limiting the hinging movement of said wing parts beyond the expanded position. On the other hand, such wing parts may be folded about hinges 57 into the collapsed shape inwardly toward the rear of body part 49, as best shown in Figs. 6 and 7, whereby the plug member can be moved through lateral opening 21 and housing 24.

As shown in the drawings, the body and wing parts of the plug member 22 may be suitably braced both vertically and horizontally so as to provide in the expanded position thereof a subtantially rigid barrier to fluid flow within the line. In this expanded position, with parts 58 and 59 abutting one another, the body part 49 and wing part 56 provide a substantially circular backup plate about the periphery of which a resilient sealing element 60 may be secured by bolts 62 for engagement with the inside diameter of the line. This sealing element 60 may be ring-shaped and have a lip-type seal 61 thereabout adapted to be forced into tight sealing engagement with the line by fluid pressure from a direction in which said lip-type seal extends. Thus, the plug member 22 is adapted to seal against pressure from the left in Figs. 3 and 5.

A thin foldable sheet 63 of rubber or the like is disposed across the front of the backup plate to prevent the leakage of fluid therepast through the hinge connections 57. As shown in Fig. 9, the sheet is arranged concentrically of the plate with its outer edge overlapped beneath the inner edge of sealing element 60 such that it may be attached to the plate by bolts 62. Further, arcuate plates 63a and 63b on body parts 49 and wing parts 56, respectively, maintain the overlapping edges of the sealing element and sheet in tight engagement under pressure of the fluid sealed against.

Although as shown in this particular embodiment of the invention, the plug member 22 is adapted to be moved laterally within the line to one side of the opening 21 downstream of the fluid pressure to be sealed against, and for this purpose the lip 61 extends upstream, it will be understood that other peripheral sealing arrangements may be provided. For example, the periphery of the expanded plug member 22 may be provided with an O-ring type seal, in which case such plug member may be moved laterally of the line either upstream or downstream of the opening 21.

As best shown in Figs. 4 and 8, the upper and lower ends of body part 49 of the plug member are provided with means for rotatably supporting rollers 64 adapted to facilitate lateral movement of the plug member within the line, as will be readily apparent from Figs. 2 and 3. As indicated in such figures, the outer surface of said rollers 64 are so disposed with respect to the lip 61 that they will engage the inside diameter of the line as the lip is compressed from the outwardly extending position of Fig. 4 to the sealing position in Fig. 9.

As previously mentioned, the plug member is expandable and collapsible by means of rods swivelly connected between the carrier and the foldable wing parts of the plug member. These rods, which are designated by the reference character 65, have swivel connections 66 with the sides of plates 46 opposite that to which the links 51 are connected and at 67 to the front side of wing parts 56. As best shown in Fig. 5, these swivel connections 66 and 67 comprise pins 68 and 69 rotatably connected to plates 46 and wing parts 56, respectively, and yokes 70 at each end of rods 65 pivotally connected about pins 71 projecting outwardly from opposite sides of rotatable pins 68 and 69.

As best shown in Figs. 1 to 3, the rods 65 are responsive to movement of plug member 22 from its first position of Fig. 1 to its second position of Fig. 3 to swing from a position extending substantially parallel of the axis of movement of carrier 29 (in a plane perpendicular to that of Figs. 1 to 3) to a position extending substantially perpendicularly thereto. During this movement, it will be understood that in swinging the wing parts 56 from a collapsed to an expanded shape, the rods will also swing outwardly (relative to the plane of Figs. 1 to 3). It will also be seen that this swinging movement of the rods 65 occurs concomitantly with the swinging of links 51 in the manner previously described. In this manner, the collapsing and expanding of the plug member is not only made operable in response to movement of the carrier 29, such that only a single mechanism is required for inserting and removing the plug member, but also the plug member 22 is fully expanded to sealingly engage with the inside diameter of the line only at those periods of its movement substantially simultaneously with arrival at and departure from its second position. Thus, in accordance with one of the novel aspects of this invention, the sliding sealing engagement of the plug member with the inside of the line during lateral movement of such member is kept to a minimum so that the forces required for so moving the plug member are not excessive.

It will further be noted that in the first position of the plug member 22, the rods 65 will be disposed at least slightly angularly of the vertical (see Fig. 6) so that the rods will not lock upon landing of the plug member 22 within the lower end of the line 20 and initial movement of said plug member from its first to its second position. Still further, in the second position of the plug member 22, the rods 65 are, similarly to the links 51, disposed substantially perpendicularly of the axis of movement of carrier 29, thus enabling maximum mechanical advantage for the linkage in expanding and collapsing the wing parts 56.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipe plugger of the type having a plug member insertable into a pipe through a lateral opening in the pipe, comprising: a housing mountable on the pipe adjacent said opening; a carrier carried by the housing; a plug having rigid portions hinged together for swinging movement from a collapsed position permitting movement of the plug through the opening to an expanded position in which the plug is adapted to extend across the pipe; and means connecting between said carrier and plug operable, upon actuation of the carrier, to move the plug through the opening with said hinged portions in collapsed position and then along the pipe to one side of the opening and to swing said hinged portions to expanded position upon the plug reaching said one side of said opening.

2. The plugger of claim 1 wherein said connecting means is operable as aforesaid responsive to movement of the carrier in a direction toward the pipe.

3. A pipe plugger comprising: a plug including rigid portions connected for movement between an expanded position in which the portions together provide a plug adapted to form a fluid barrier across the pipe and a collapsed position in which the plug is of reduced lateral dimensions, an imperforate yieldable means extending between said rigid portions and forming a fluid tight seal therebetween with the portions in expanded position, a peripheral fluid pressure energized seal carried by the plug adapted to form a fluid tight seal with the interior of the pipe when the plug is in expanded position therein; and means for moving the plug through a lateral opening in the pipe with said portions in collapsed position and then laterally and into expanded position.

4. A pipe plugger of the type having a plug insertable into a pipe through a lateral opening in the pipe, comprising: a fluid tight housing mountable on the pipe to surround the opening; a carrier mounted in the housing; a plug having a plurality of separate rigid portions movable relative to each other from an expanded position to a collapsed position permitting movement of the plug through said opening and housing, said rigid portions being of a size and shape as to together extend substantially across the cross-section of the pipe when in expanded position to provide a substantially rigid barrier to fluid flow therepast, a peripheral seal carried by the plug portions for sealing the outer periphery of the plug with said pipe when the plug portions are in expanded position; and means connecting between said carrier and plug and operable upon actuation of the carrier to move the plug through the opening and then to a plugging position across the pipe to one side of the opening and being further operable upon movement of the plug to said plugging position to move said rigid portions from collapsed to expanded position.

5. A pipe plugger comprising a plug, the plug having a backup plate formed of a plurality of rigid portions connected together for relative movement between a collapsed position and an expanded position in which such portions together provide a substantially disc-like shape adapted to extend substantially entirely across a pipe to be plugged, seal means secured to said portions to seal therebetween when the portions are in expanded position, a peripheral seal secured to at least some of said portions and adapted to form a seal between said plate and a pipe in which the portions are disposed in expanded position; and means for positioning said plug in a pipe and for moving said portions to expanded position upon positioning the plug in plugging position in the pipe.

6. A plug member, comprising a backup plate which includes portions hinged together for swinging movement relative to each other between collapsed and expanded positions, the outer edges of said portions being shaped to provide the backup plate with a substantially disc-like shape when said portions are in expanded position, and a sealing member secured to one side of said backup plate to prevent fluid flow past the backup plate via the hinged connections between said portions and including a fluid pressure energized seal projecting from the outer edges of said plate to form a peripheral seal therearound.

7. A pipe line plugger of the type having a plug member insertable into a line through a lateral opening in the line which is smaller than the inside diameter of the line, comprising a housing mountable on the line to surround the opening, a carrier axially movable within the housing, a plug member expandable between a collapsed shape permitting movement through the lateral opening and an expanded shape for sealing engagement with the inside diameter of the line, linkage means pivotally connecting the carrier and plug member operable upon movement of the carrier to move the plug member through the opening and between a first position across the line and a second position across the line to one side of the opening and laterally of said first position, and additional means connecting the carrier and plug member for maintaining the latter in collapsed shape during movement through the opening, said additional means being responsive to movement of said plug member from said first to said second position to expand said member into sealed engagement with the line to said one side thereof and responsive to movement of said plug member from said second to said first position to collapse said member to said shape permitting movement thereof through the lateral opening in the line.

8. A pipe line plugger of the type having a plug member insertable across the line through a lateral opening therein, comprising a housing mountable on the line in surrounding relation to the opening, a carrier movable axially within the housing toward and away from the line, a plug member including a body part and wing parts hingedly connected to opposite edges of said body part for swinging movement between one position in which the peripheries of said parts are adapted to engage about the inner circumference of the line and another position in which said plug member has a lateral dimension less than the diameter of the pipe, a linkage pivotally connecting the carrier and body part operable upon movement of the carrier axially of the housing to move the plug member through the opening and between a first position across the line relatively adjacent the carrier and a second position across the line to one side of the opening and more laterally disposed of the carrier, and rods swivelly connected to the carrier and each of said wing parts responsive to movement of the plug member from said first to said second position to move the wing parts from said other to said one position, and responsive to movement of said plug member from said second to said first position to move the wing parts from said one to said other position.

9. A pipe line plugger of the character defined in claim 8, wherein the pivotal linkage connecting the carrier and body part is of a parallelogram type for maintaining the plane of the periphery of said body part substantially parallel to the axis of the housing during movement of the plug member, and wherein the lateral dimension of said plug member in the other position of said wing parts is adapted to fit closely within the diameter of said housing.

10. A pipe line plugger of the character defined in claim 8, wherein said linkage and said swivelly connected rods are adapted to extend substantially perpendicularly of the housing axis in said second position of the plug member.

11. For use in plugging a pipe line having a lateral opening therein smaller than the inside diameter thereof, a plug member including a body part and wing parts hingedly connected to opposite edges of the body part, a carrier adapted to be moved axially of the opening for inserting the plug member within the line, linkage means pivotally connecting the plug member body part to the carrier for swinging said plug member from a first position relatively adjacent the carrier to a second position laterally thereof for disposal across said line to one side of the opening, additional linkage means connecting said carrier with each of said wing parts and responsive to movement of said plug member from its first to its second position for moving said wing parts from positions angularly disposed to said body part, which permit the plug member to be inserted within the housing opening, to positions in substantial alignment therewith, and means on each of said body and wing parts cooperable upon movement of said wing parts to said latter position to form a seal peripherally of the plug member for engagement with the inner diameter of said line at said one side of the opening.

12. A plug member of the character defined in claim 11, wherein said additional means comprises rods having swivel joints at opposite ends for connection with said carrier and each of said wing parts.

13. A plug member, comprising a backup plate which includes a body and wings hingedly connected to opposite edges of said body, portions on said wings abuttable with portions on said body when swung into a position substantially aligned therewith, the outer edges of said body and wings being curved to provide the backup plate with a substantially disc-like shape in said aligned position, and a sealing member secured to one side of said plate and including a lip seal projecting from the outer edges of the body and wings to seal against pressure from said one side.

14. A plug member of the character defined in claim 13, wherein rollers are mounted along the outer edges of the body intermediate the edges of such body to which the wings are hingedly connected.

References Cited in the file of this patent

UNITED STATES PATENTS

| | | |
|---|---|---|
| 1,695,187 | Goodman | Dec. 11, 1928 |
| 1,988,077 | Goodman | Jan. 15, 1935 |
| 2,476,907 | Preston et al. | July 19, 1949 |